United States Patent Office 3,574,183
Patented Apr. 6, 1971

3,574,183
WATER-INSOLUBLE MONOAZO DYESTUFFS
Winfried Kruckenberg, Leverkusen, Germany, assignor to Farbenfabriken Bayer Aktiengesellschaft, Leverkusen, Germany
No Drawing. Filed Feb. 3, 1967, Ser. No. 613,750
Claims priority, application Germany, Feb. 12, 1966, F 48,416
Int. Cl. C09b 29/08; D06p 1/02
U.S. Cl. 260—207.1
3 Claims

ABSTRACT OF THE DISCLOSURE

Azo dyestuffs useful in dyeing and printing hydrophobic fibrous materials are provided which correspond to the formula

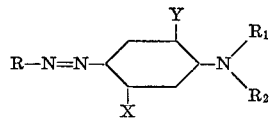

wherein R is a cyclic radical; X is acylamino; Y is hydrogen, halogen, alkyl, or an alkoxy radical; $R_1$ is an aliphatic ether radical terminated by an alkoxy carboxy radical; and $R_2$ is either an alkyl radical or an $R_1$ radical.

The present invention relates to water-insoluble azo dyestuffs of the formula

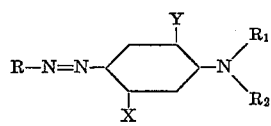 (I)

These valuable new dyestuffs are obtained by coupling a diazo component of the benzene or heterocyclic series with an amine of the general formula

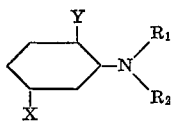 (II)

in the p-position to the amino group, choosing the starting components free from sulphonic acid and carboxylic acid groups.

In the general formulae, R means a radical of the benzene or heterocyclic series, X is hydrogen, an alkyl, alkoxy, halogen or acylamino substituent, Y stands for hydrogen, halogen or for an alkyl or alkoxy group, $R_2$ means an optionally substituted alkyl radical, such as —$CH_3$, —$C_2H_5$, —$C_3H_7$, —$C_4H_9$, —$C_2H_4CN$ or β-carboalkoxyethyl, alkoxyalkyl or the radical $R_1$; $R_1$ means a group

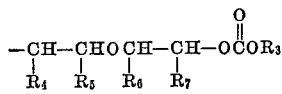

in which $R_4$, $R_5$ $R_6$ and $R_7$ represent hydrogen or lower alkyl radicals containing 1–2 carbon atoms, and $R_3$ means an optionally substituted lower alkyl radical.

The coupling of the starting component is carried out in the usual manner, preferably in an acidic solution or suspension. As diazo components of the benzene series, those aniline derivatives which contain one or several cyano groups prove to be especially advantageous, inter alia. Examples of suitable diazo components include: 4 - cyanoaniline, 4 - nitroaniline, 4 - nitro - 2 - chloroaniline, 4 - nitro - 2 - cyanoaniline, 2,4 - dicyanoaniline, 2,4 - dinitroaniline, 3 - chloro - 4 - cyanoaniline, 2 - cyano- 5 - chloroaniline, 3,4 - dicyanoaniline, 2,5 - dicyanoaniline, 2,6 - dichloro - 4 - nitroaniline, 2 - chloro - 4 - cyanoaniline, 4 - amino - acetophenone, 2 - amino - 5 - nitrotoluene, 2 - amino - 5 - nitroanisole, 3 - nitro - 4 - aminotoluene, 2,4 - dichloroaniline, 2,5 - dichloro - 4 - nitroaniline, 2 - trifluoromethyl - 4 - chloroaniline, 3 - chloro- 4 - amino - 1 - trifluoromethylbenzene, 2 - cyano - 4,5,6- trichloroaniline, 2,4 - dinitro - 6 - bromoaniline, 2 - cyano- 4,6 - dinitroaniline, 2 - cyano - 6 - bromo- or -6-chloro- 4 - nitroaniline, 2,4 - dicyano - 6 - chloroaniline, 2- methoxy - 4 - nitroaniline, 2 - amino - 5 - nitro - benzoic acid methyl ester, 4 - amino - benzoic acid alkylamides, such as -methyl- or -dimethylamide, 4 - amino - benzoic acid methyl ester, 3 - nitro - 4 - aminobenzoic acid butyl ester, 1 - aminobenzene - 3 - or -4-methylsulfone or -ethylsulfone;

The following diazo components of the heterocyclic series are particularly useful: 2 - amino - 5 - nitrothiazole, 2 - amino - 4 - phenyl - thiadiazole - 1,3,5; 2 - amino-5- aceto - 3 - nitrothiophene, 2 - amino - benzothiazole, amino - triazole, 2 - amino - 5 - nitro - thiadiazole - 1,3,4; 6 - methoxy - 2 - aminobenzthiazole.

The amines specified in the following may be used as coupling components, for example:

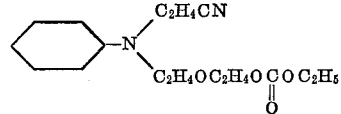

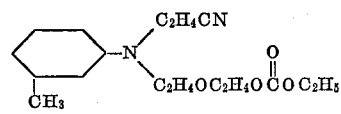

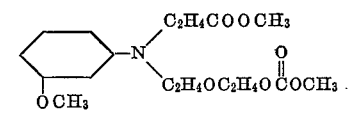

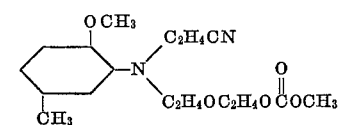

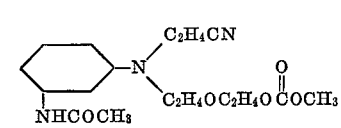

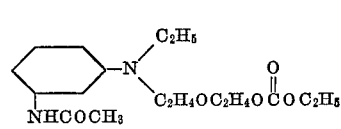

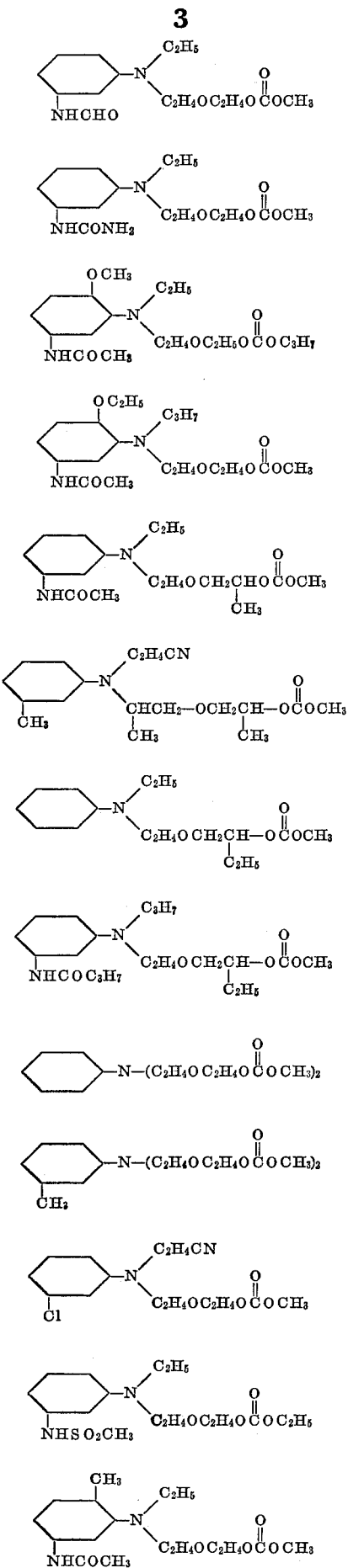

The other alkyl radicals, e.g. the radicals $R_3$ and $R_2$, may also be further substituted and be present, for example, in the form of haloalkyl radicals, such as chloroethyl; cyanoalkyl radicals, such as cyanoethyl; or carbalkoxyalkyl radicals, such as carbomethoxy- (or -ethoxy-)ethyl radicals. Although, within the scope of the present invention, the definition of the radical $R_1$ as a substituted alkyl radical also comprises the term "an optionally substituted alkyl radical," this radical has been separately mentioned in the definition because of its specific construction.

The coupling components (II) can be obtained by reacting at 130° C., for example, aniline, which may contain the substituents X and Y, e.g. an N-β-chloroethyl-N-alkylaniline, in ethylene glycol with ethyleneglycol-monosodium alcoholate, distilling the product and allowing the base to react in pyridine with chloroformic acid alkyl ester to give the corresponding carbonate.

The above-mentioned method for the production of the new azo-dyestuffs may also be modified in such a way that the formation of the carbonate groups takes place only in the final stage of the process, i.e. after coupling of the diazo component and, in this case, hydroxyethyl group-containing aniline coupling component, or that an acylamino group Z is converted into an acylamino group of a different type, in the final stage of the process, by selective hydrolysis and renewed acylation.

The dyestuffs which can be obtained by the present process are eminently suited for the dyeing and printing of hydrophobic material, especially of textiles or fibres of aromatic polyesters, for example of polyethylene terephthalates or of condensation products of terephthalic acid and 1,4-bis-(hydroxymethyl)-cyclohexane. Dyeings and prints of very good fastness properties, especially very good fastness to light, washing and thermofixation, are obtained on these materials. The dyestuffs are characterised by a good affinity.

The dyestuffs are also suitable for the dyeing and printing of cellulose acetate and triacetyl cellulose and of synthetic polyamide and polyacrylonitrile fibre material.

The following examples are given for the purpose of illustrating the invention.

EXAMPLE 1

16.3 parts by weight 2-cyano-4-nitraniline are dissolved at 0–15° C. in 400 parts by weight concentrated sulphuric acid, diazotised with 170 parts by volume nitrosylsulphuric acid (42 g. nitrite in 100 ml. $H_2SO_4$), with good stirring and cooling, and after about 3 hours poured on to about 3000 parts by weight ice. A small excess of nitrite is removed by amidosulphonic acid and the solution filtered. This solution is then combined with a solution of 29.7 parts by weight of the amino compound of the formula partially neutralised with a dilute sodium hydroxide solution and the coupling completed with sodium acetate. The dyestuff is filtered and washed. In the dry state it is a black powder which dissolves in organic solvents, such as acetone or alcohol, with a blue colour. When finely dispersed by suitable additives, it dyes acetate rayon fabrics in clear violet shades of good fastness to washing and light.

By the same method, the following dyestuffs can be obtained from the appropriate starting components, they dye fabrics of aromatic polyesters, such as polyethylene terephthalates, in the specified shades:
| Structure | Shade |
|---|---|
| 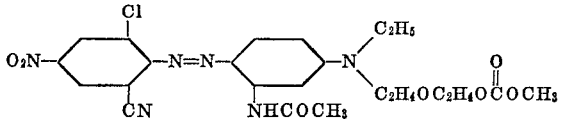 | Blue. |
| 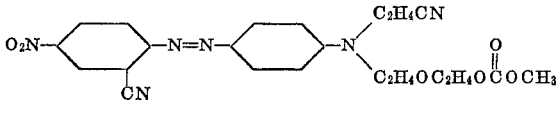 | Red. |
| 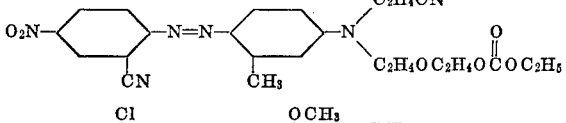 | Red. |
| 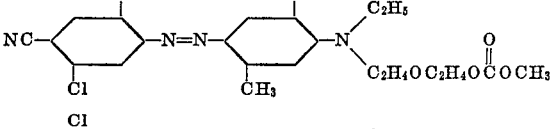 | Red. |
| 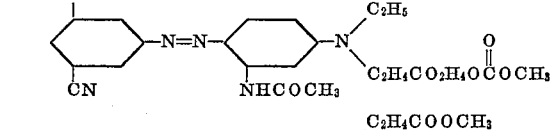 | Red. |
| 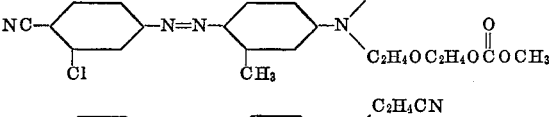 | Orange. |
| 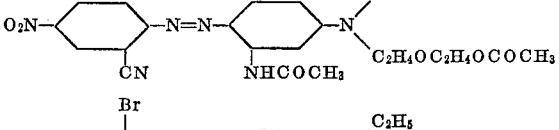 | Red. |
| 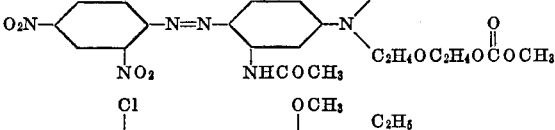 | Blue. |
| 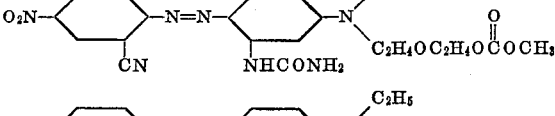 | Do. |
| 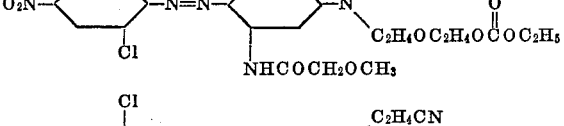 | Violet. |
| 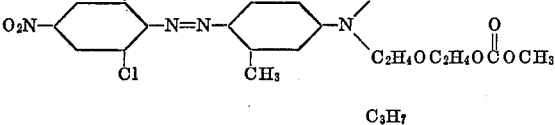 | Brown. |
| 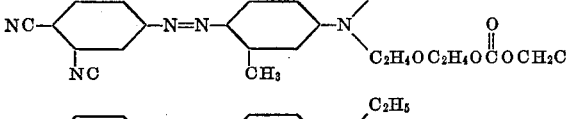 | Orange. |
| 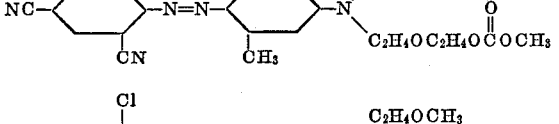 | Red. |
| 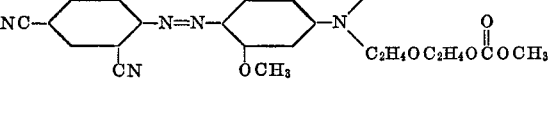 | Red. |

| Structure | Shade |
|---|---|
| $O_2N-C_6H_3(Cl)-N=N-C_6H_3(CH_3)-N(C_2H_4CN)(C_2H_4OCH_2CH(CH_3)OCOCH_3)$ | Red. |
| $O_2N-C_6H_4-N=N-C_6H_3(CH_3)-N(C_2H_5)(CH(CH_3)CH_2OCH_2CH(CH_3)OCOCH_3)$ | Red. |
| $O_2N-C_6H_2(Br)(CN)-N=N-C_6H_2(OC_2H_5)(NHCOCH_3)-N(C_2H_5)(C_2H_4OC_2H_4OCOCH_3)$ | Blue. |
| $CH_3SO_2-C_6H_4-N=N-C_6H_3(NHCHO)-N(C_2H_5)(C_2H_4OC_2H_4OCOCH_3)$ | Violet. |
| $NC-C_6H_2(Cl)_2-N=N-C_6H_3(NHCOCH_3)-N(C_2H_4CN)(C_2H_4OC_2H_4OCOCH_3)$ | Scarlet. |
| $Cl-C_6H_3(CN)-N=N-C_6H_3(NHCOCH_3)-N(C_2H_4CN)(C_2H_4OC_2H_4OCOCH_3)$ | Orange. |
| $CH_3CO-C(=CH-)-C(S-)=C(NO_2)-N=N-C_6H_3(NHCOCH_3)-N(C_2H_4CN)(C_2H_4OC_2H_4OCOCH_3)$ | Blue. |
| $O_2N-C(S-CH=N-)=C-N=N-C_6H_3(NHCOCH_3)-N(C_2H_5)(C_2H_4OC_2H_4OCOCH_3)$ | Do. |
| $O_2N-C_6H_2(Cl)(CN)-N=N-C_6H_3(NHCOCH_3)-N(C_2H_4CN)(C_2H_4OC_2H_4OCOCH_3)$ | Violet. |
| $O_2N-C_6H_3(CN)-N=N-C_6H_4-N(C_2H_5)(C_2H_4OC_2H_4OCOCH_3)$ | Do. |
| $C_6H_5-C(=N-S-N=)O-N=N-C_6H_4-N(C_2H_4CN)(C_2H_4OC_2H_4OCOCH_3)$ | Orange. |
| $O_2N-C(S-CH=N-)=C-N=N-C_6H_4-N(C_2H_4CN)(C_2H_4OC_2H_4OCOCH_3)$ | Violet. |
| $O_2N-C_6H_2(Cl)(CN)-N=N-C_6H_4-N(C_2H_4CN)(C_2H_4OC_2H_4OCOCH_3)$ | Ruby. |
| $NC-C_6H_3(CN)-N=N-C_6H_3(CH_3)-N(C_2H_4CN)(C_2H_4OC_2H_4OCOCH_3)$ | Scarlet. |

| Structure | Shade |
|---|---|
| 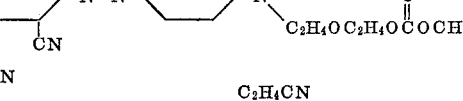 | Orange. |
| 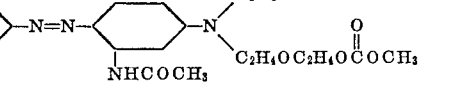 | Red. |
| 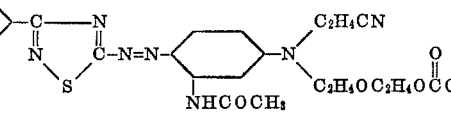 | Scarlet. |
| 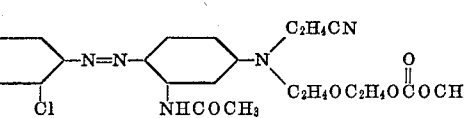 | Bluish scarlet. |
| 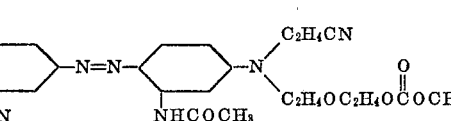 | Red. |
| 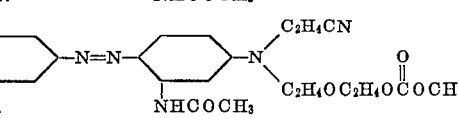 | Yellowish scarlet. |
| 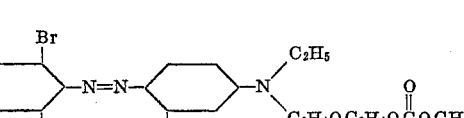 | Reddish orange. |
| 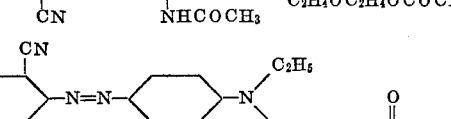 | Blue |
| 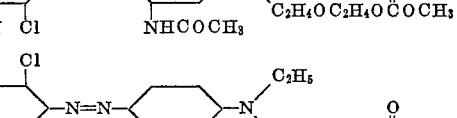 | Violet. |
| 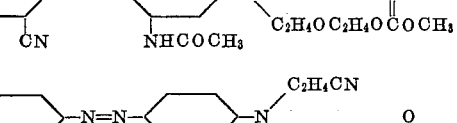 | Bluish ruby. |
|  | Yellowish scarlet. |
| 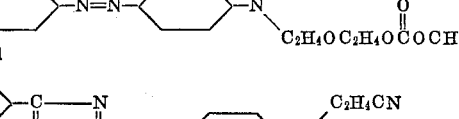 | Orange. |
| 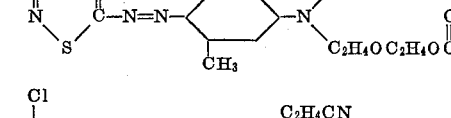 | Scarlet. |

| Structure | Shade |
|---|---|
| 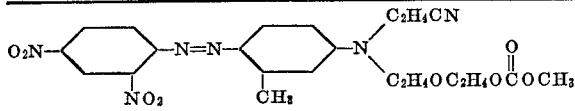 | Red. |
| 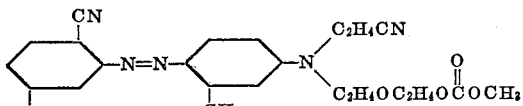 | Orange. |
| 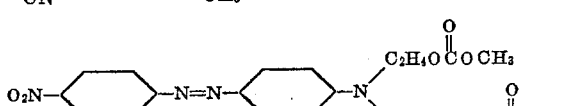 | Violet. |
| 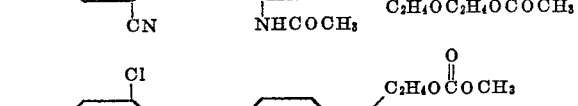 | Blue. |
|  | Violet. |
| 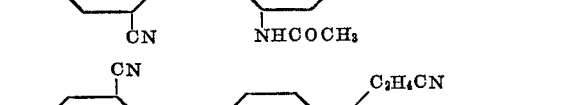 | Red violet. |
| 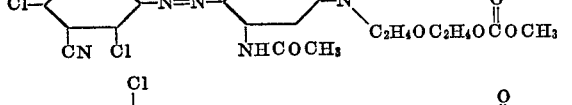 | Violet. |
| 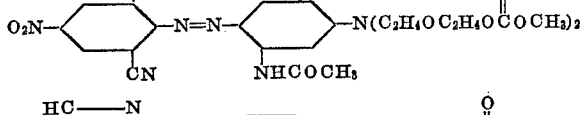 | Blue. |
| 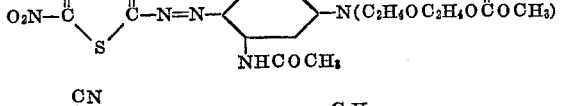 | Red. |
| 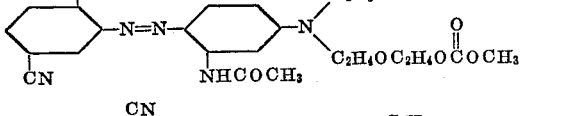 | Blue. |

The base of the formula

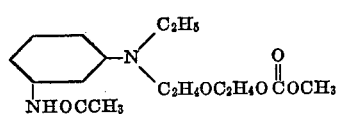

used in some dyestuffs of these examples as coupling component can be prepared in the following manner:

1 mol N-ethyl-m-acetylamino-aniline is admixed at 120 to 140° C., in the course of 6 to 8 hours, with 1.2 mol β-chloro-β'-methoxy-carbonyl-hydroxy-diethyl ether and 1.2 mol anhydrous sodium acetate in such a manner that the amount of sodium acetate is always somewhat smaller than required. The completion of the reaction is ascertained by chromatography. The base thus obtained may be separated from the other reaction products with water and a mixture of methanol and water, but it may also be converted into the dyestuff without further purification.

Other aromatic amines which contain the group

can be obtained in the same manner. When the nitrogen is substituted by a cyanoethyl group, it is expedient to work with the corresponding bromine or iodine ether at about 90 to 110° C.

EXAMPLE 2

250 g. polyethylene terephthalate fibres are introduced at 50° C. into a dyebath of 8 litres which contains 4 g. of an emulsifying polyglycol ether and 4 g. of the finely dispersed dyestuff according to Example 1 as well as 16 g. of a carrier, for example benzoic acid, and 20 g. diammonium phosphate. The bath is heated to boiling in the course of 30 minutes and dyeing is continued at this temperature for 1½ to 2 hours. The dyeing is then washed at 70° C. for 20 minutes in an alkaline medium, rinsed and dried. A clear rust-blue dyeing, fast to light and washing, is obtained which is characterised by good fastness to thermofixation.

I claim:

1. Sulfonic acid and carboxylic acid free azo dyestuffs of the general formula

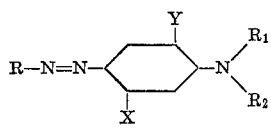

in which

R is a member selected from the group consisting of monocyano phenyl, dicyano phenyl, substituted phenyl and substituted mono or dicyano phenyl wherein the substituents are 1 to 3 substituents selected from the group consisting of chlorine, bromine, methyl, methoxy, nitro, and lower alkyl sulfone groups;

X is selected from the group consisting of NHCOH, NHCOCH$_3$, NHCONH$_2$, NHCOC$_3$H$_7$, NHCOCH$_2$OCH$_3$, and NHSO$_2$CH$_3$;

Y is a member selected from the group consisting of hydrogen, methyl and lower alkoxy; R$_1$ is a radical of the formula

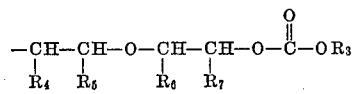

wherein

R$_4$, R$_5$, R$_6$ and R$_7$ are members selected from the group consisting of hydrogen and a C$_1$-C$_2$ alkyl radical;

R$_3$ is a member selected from the group consisting of lower alkyl and lower alkyl substituted by CN; and R$_2$ is a member selected from the group consisting of lower alkyl with 1 to 4 carbon atoms, lower alkyl with 1 to 4 carbon atoms substituted by a member selected from the group consisting of chlorine, cyano, lower carboalkoxy with 1 to 4 carbon atoms in the alkoxy group, methoxy, and oxycarboalkoxy with 1 to 4 carbon atoms in the alkoxy group or R$_2$ is a radical R$_1$.

2. The dyestuff of claim 1 wherein Y is hydrogen or lower alkoxy, R$_4$, R$_5$, R$_6$ and R$_7$ are hydrogen and R$_2$ is lower alkyl with 1-4 carbon atoms, cyanoethyl, or R$_1$.

3. The dyestuff of claim 1 of the formula

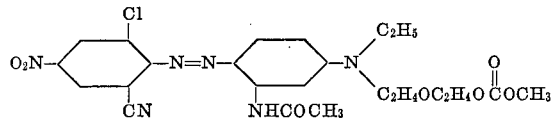

References Cited

UNITED STATES PATENTS 3,268,507  8/1966  Kruckenberg _____ 260—207

FOREIGN PATENTS 933,160  8/1963  Great Britain.

CHARLES R. PARKER, Primary Examiner

D. M. PAPUGA, Assistant Examiner

U.S. Cl. X.R.

260—158, 207, 463; 8—177, 178, 179

UNITED STATES PATENT OFFICE
CERTIFICATE OF CORRECTION

Patent No. 3,574,183              Dated   April 6, 1971

Inventor(s)   WINFRIED KRUCKENBERG ET AL.

It is certified that error appears in the above-identified patent and that said Letters Patent are hereby corrected as shown below:

| Column | Line | Error |
|---|---|---|
| 3 | 15 | "$C_2H_4OC_2H_5$" should be ---$C_2H_4OC_2H_4$--- |
| 4 | 10 | "construction" should be ---constitution--- |
| 5-6 | 5th formula | 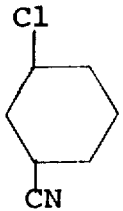 should be 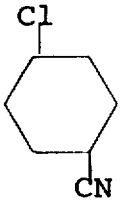. |
| 5-6 | 5th formula | "$C_2H_4CO_2H_4O\overset{O}{\overset{\|}{C}}OCH_3$" should be ---$C_2H_4OC_2H_4O\overset{O}{\overset{\|}{C}}OCH_3$--- |

UNITED STATES PATENT OFFICE
CERTIFICATE OF CORRECTION

Patent No. 3,574,183      Dated April 6, 1971

Inventor(s) WINFRIED KRUCKENBERG ET AL.

It is certified that error appears in the above-identified patent and that said Letters Patent are hereby corrected as shown below:

| Column | Line | Error |
|---|---|---|
| 5-6 | 7th formula | "$C_2H_4OC_2H_4OCOCH_3$" should be $$---C_2H_4OC_2H_4O\overset{O}{\overset{\|\|}{C}}OCH_3---$$ |
| 7 | 2nd formula | "$CH-CH_2OCH_2CHO\overset{O}{\overset{\downarrow}{C}}OCH_3$" should be $$---CH-CH_2OCH_2CHO\overset{O}{\overset{\|\|}{C}}OCH_3---$$ |
| 7 | 11th formula | "$\begin{array}{c} C=N \\ N\diagdown_S\diagup O \end{array}$" should be $$---\begin{array}{c} C=N \\ N\diagdown_S\diagup C \end{array}---$$ |

Page 3

UNITED STATES PATENT OFFICE
CERTIFICATE OF CORRECTION

Patent No. 3,574,183                    Dated April 6, 1971

Inventor(s) WINFRIED KRUCKENBERG ET AL.

It is certified that error appears in the above-identified patent and that said Letters Patent are hereby corrected as shown below:

| Column | Line | Error |
|---|---|---|
| 7 | 12th formula | 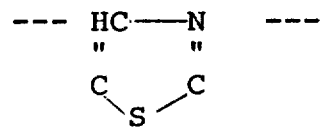   should be |

```
    --- HC----N   ---
         ‖    ‖
         C    C
          \  /
           S
```

Signed and sealed this 19th day of October 1971.

(SEAL)
Attest:

EDWARD M. FLETCHER, JR.          ROBERT GOTTSCHALK
Attesting Officer                Acting Commissioner of Patents